Patented May 25, 1948

2,442,061

UNITED STATES PATENT OFFICE 2,442,061

ACID STABILIZED LIGHT-SENSITIVE DIAZOTYPE COATING

Sam Charles Slifkin, Binghamton, N. Y., assignor to General Aniline & Film Corporation, New York, N. Y., a corporation of Delaware No Drawing. Application September 26, 1944, Serial No. 555,898

3 Claims. (Cl. 95—7)

The present invention relates to light sensitive coatings containing diazo compounds.

It has been proposed to prepare light sensitive coatings in which the diazo component and coupling component present are prevented from coupling by the presence of a carboxylic acid with or without other stabilizing substances, the coupling being brought about by exposure to an alkaline medium. However, such coatings, due to premature coupling upon long storage, or for other reasons, do not burn out completely white, and prints made therefrom are lacking in contrast.

It is an object of the present invention to provide diazotype coatings having an improved shelf life, that is, which may be stored for a long time without discoloration or premature coupling.

A further object is the provision of diazotype papers presenting a clear white in the burned out portion, and which provide improved contrast.

Still another object is the provision of diazotype paper which after exposure and development has improved permeability to ultra violet light.

In accordance with the present invention light sensitive coatings are prepared comprising a diazo compound and a coupling component, together with a weak organic acid and phosphoric acid or one of its soluble primary salts, and are applied to a suitable base or carrier. After exposure to a suitable light source in juxtaposition to a suitable pattern to be reproduced, development of the color is brought about by exposure to an alkaline medium, such as ammonia fumes. Light sensitive layers prepared in accordance with the invention show less tendency to precouple, and prints prepared therefrom and developed in the usual manner show a greater whiteness in the burned out areas. Furthermore, prints thus obtained are more transparent to ultra violet light with the result that intermediate prints produced from papers so coated enable faster reprinting. In addition to the ingredients above specified in the light sensitive composition, there may be present other substances, as for example, anti-yellowing substances and the like. For example, other compounds that may be included in the light sensitive layer are 1,3,6-naphthalene trisulfonic acid, compounds of thiocarbonic acids, aryl guanidines, sodium thiosulfate, nickel sulfate, and aluminum sulfate, for the respective purposes well understood in the art.

Examples of soluble primary salts of phosphoric acid employed in compositions of the present invention are sodium dihydrogen phosphate, potassium dihydrogen phosphate, ammonium dihydrogen phosphate, calcium superphosphate and the like. I prefer to employ commercial syrupy phosphoric acid. The concentration of the phosphoric acid compound may be varied, and generally I prefer to employ the equivalent of about a tenth normal solution of phosphoric acid. I believe the phosphoric acid compounds behave as a buffer to provide a relatively high stable hydrogen ion concentration in the light sensitive layer, so that the action of small quantities of alkali, such as might be present in the air, etc., do not produce a marked change in hydrogen ion concentration and thus coupling with the coupling component or self coupling of the diazo compound is prevented. In this respect the phosphoric acid compounds differ from boric acid which is slightly soluble in water and very weakly ionized; when the phosphoric acid compounds are employed in mixture with boric acid, they supplement the action thereof. In the concentrations herein employed phosphoric acid has substantially no deleterious effect upon the paper employed as a carrier for the light sensitive layer. The phosphoric acid compound together with a weak organic acid, particularly a hydroxycarboxylic acid such as a citric acid, tartaric acid, or the like, with or without the addition of boric acid, constitutes a complex system that produces results not obtained by any of the ingredients alone.

The diazo compounds may be employed in any suitable light sensitive form as for example, in the form of the diazo salt, zinc chloride double salt, the cadmium chloride double salt, the chlorobenzene sulfonate, the tin chloride double salt, the borofluoride, and the like. In particular, the diazo compounds of the alkyl diamines are preferred as they give dark tones, but diazo compounds of the hydroxy- or alkoxy-amines may be employed if desired. As examples of suitable diazo compounds I may mention the diazo compounds of p- or o-phenylene diamine, 4-amino-1 - dialkylanilines, p-amino - diphenylamine, 4-amino-N-benzyl N-alkyl anilines, phenetidine, anisidine, 2,4 - dimethoxyaniline, p - phenylenediamine, sulfonic acid, p-amino-diphenylamine, p-cyclohexylaminoaniline, 4-monoethylamino-2-methyl-1-aminobenzene, 2,1 - aminonaphthol-4-sulfonic acid, 1-dimethylamino-4-amino-3-benzoic acid, p-dimethyl-aminoaniline sulfonic acid, p-aminodiphenylamine, 4(2',6' - dichlorobenzyl) amino aniline, 3 - aminocarbazole, 4 - ethoxy-1-aminobenzene, 2,4-dimethoxy - 1 - aminobenzene, p-aminophenol, 1-amino - 2 - hydroxy-4-chlorobenzene-6-sulfonic acid, and the like. As examples of the coupling components which may be employed I may mention resorcinol, phloroglucine, and 2,3-dihydroxynaphthalene - 6 - sulfonic acid. Other suitable coupling components are well known in the art and need not be specifically enumerated here.

The invention will be described in greater detail in the following examples which illustrate the invention:

*Example I*

A suitable paper is coated with a liquid containing 3 grams zinc chloride double salt of para-diazo-N-dimethyl phenylene - diamine, 5 grams 2.3 - dihydroxynaphthalene - 6 - sulfonic acid, 5 grams citric acid, 3 cc. phosphoric acid, 5 grams thiourea, 5 cc. glycerin and 100 cc. water.

After drying, prints obtained by exposure of the coated paper and development by exposure to ammonia fumes provide blue lines on a white background.

*Example II*

A thin paper is coated with a composition made up of 6 grams para-diazo-N-dimethyl phenylene diamine, 3 grams resorcinol, 5 grams citric acid, 3 cc. phosphoric acid, 4 grams boric acid, 5 grams thiourea, 5 cc. glycerin and 100 cc. water.

After drying, and exposure as above described, a sepia line intermediate paper is obtained from which reprints may be made with a relatively fast exposure.

I claim:

1. A carrier having a light sensitive layer comprising a diazo compound, a coupling component, a weak organic acid, boric acid and a material selected from the group consisting of phosphoric acid and its soluble primary salts.

2. As a new product, a carrier having a light sensitive layer comprising a diazo compound, a coupling component, a hydroxycarboxylic acid, boric acid and a material selected from the group consisting of phosphoric acid and its water soluble primary salts.

3. As a new product, a carrier having a light sensitive layer comprising a diazo compound of N,N-dimethyl phenylenediamine, a coupling component, citric acid, boric acid, and phosphoric acid.

SAM CHARLES SLIFKIN.

REFERENCES CITED

The following references are of record in the file of this patent:

UNITED STATES PATENTS

| Number | Name | Date |
| --- | --- | --- |
| 1,628,279 | Schmidt et al. | May 10, 1927 |
| 1,753,059 | Murray | Apr. 1, 1930 |
| 1,758,676 | Schmidt et al. | May 13, 1930 |
| 1,967,371 | Schmidt et al. | July 24, 1934 |
| 1,983,005 | Sakurai | Dec. 4, 1934 |
| 1,989,065 | Schmidt et al. | Jan. 22, 1935 |
| 2,113,944 | Leuch | Apr. 12, 1938 |
| 2,326,782 | Jacobus et al. | Aug. 17, 1943 |
| 2,354,008 | Reichel | July 18, 1944 |

FOREIGN PATENTS

| Number | Country | Date |
| --- | --- | --- |
| 628,286 | France | June 27, 1927 |
| 489,214 | Great Britain | July 21, 1938 |